United States Patent
Arunkumar et al.

(10) Patent No.: US 10,785,217 B2
(45) Date of Patent: Sep. 22, 2020

(54) SYSTEM, METHOD AND COMPUTER PROGRAM PRODUCT FOR CONTROLLING AND ALTERING BIOLOGICAL, BIOMETRIC, AND IDIOSYNCRATIC AUTHENTICATIONS

(71) Applicant: International Business Machines Corporation, Armonk, NY (US)

(72) Inventors: Saritha Arunkumar, Hursley (GB); Kuntal Dey, New Delhi (IN); Nizar Lethif, Yorktown Heights, NY (US); Enara C. Vijil, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 309 days.

(21) Appl. No.: 15/402,406

(22) Filed: Jan. 10, 2017

(65) Prior Publication Data

US 2018/0196936 A1 Jul. 12, 2018

(51) Int. Cl.
*G06F 21/32* (2013.01)
*H04N 21/4415* (2011.01)
(Continued)

(52) U.S. Cl.
CPC .......... *H04L 63/0861* (2013.01); *G06F 21/32* (2013.01); *H04L 9/3231* (2013.01);
(Continued)

(58) Field of Classification Search
CPC .......... H04L 63/0861; H04L 2463/082; H04L 63/10; H04L 9/3231; H04L 29/06755;
(Continued)

(56) References Cited

U.S. PATENT DOCUMENTS

| 7,100,203 B1 * | 8/2006 | Tosey | G06F 21/31 713/167 |
| 8,584,219 B1 * | 11/2013 | Toole | G06F 21/60 726/25 |

(Continued)

OTHER PUBLICATIONS

Mel, et al. "The NIST Definition of Cloud Computing". Recommendations of the National Institute of Standards and Technology. Nov. 16, 2015.
(Continued)

*Primary Examiner* — Alexander Lagor
*Assistant Examiner* — Howard H. Louie
(74) *Attorney, Agent, or Firm* — Anthony Curro, Esq.; McGinn IP Law Group, PLLC

(57) ABSTRACT

An authentication control method, system, and computer program product, includes performing an initial calibration to login to a registered device by detecting a plurality of biological signals, biometric signals, and idiosyncratic signals of a user and selecting a combination of the plurality of biological signals, biometric signals, and idiosyncratic signals to use in an initial calibration-authentication score, computing a login-authentication score at a time of the login based on a user input of signals corresponding to the signals of the initial calibration-authentication score, and allowing the login to the registered device if the login-authentication score is within a predetermined threshold of the initial calibration-authentication score.

13 Claims, 5 Drawing Sheets

(51) Int. Cl.
*H04L 9/32* (2006.01)
*H04L 29/06* (2006.01)

(52) U.S. Cl.
CPC .. *H04L 29/06755* (2013.01); *H04L 29/06809* (2013.01); *H04N 21/4415* (2013.01); *H04L 2463/082* (2013.01)

(58) Field of Classification Search
CPC ... H04L 29/06809; G06F 21/32; G06F 21/31; G06F 21/44; G06F 21/30; G06F 2221/2129; H04N 21/4415
See application file for complete search history.

(56) References Cited

U.S. PATENT DOCUMENTS

| | | | |
|---|---|---|---|
| 8,752,145 B1* | 6/2014 | Dotan | H04L 63/0861 340/5.2 |
| 9,118,669 B2 | 8/2015 | Moganti et al. | |
| 9,454,656 B2 | 9/2016 | Oberheide et al. | |
| 2005/0166065 A1* | 7/2005 | Eytchison | H04L 63/08 713/189 |
| 2006/0210119 A1* | 9/2006 | Willis | G06K 9/00892 382/115 |
| 2008/0253619 A1* | 10/2008 | Hagino | G06F 21/32 382/115 |
| 2010/0089992 A1* | 4/2010 | Kitada | G06Q 10/00 235/375 |
| 2013/0318361 A1 | 11/2013 | Erickson et al. | |
| 2015/0113636 A1 | 4/2015 | Forbes et al. | |
| 2015/0332273 A1 | 11/2015 | Bruno | |
| 2016/0171199 A1 | 6/2016 | Beatson et al. | |
| 2016/0180068 A1 | 6/2016 | Das et al. | |
| 2016/0182503 A1 | 6/2016 | Cheng et al. | |
| 2016/0188862 A1 | 6/2016 | Singh et al. | |
| 2016/0197917 A1 | 7/2016 | Lee et al. | |
| 2016/0226868 A1 | 8/2016 | Harding | |
| 2016/0241552 A1 | 8/2016 | Lindemann | |
| 2016/0267265 A1* | 9/2016 | Waltermann | G06F 21/32 |
| 2016/0275281 A1 | 9/2016 | Ranjit et al. | |

OTHER PUBLICATIONS

Aronowitz, H., Li, M., Toledo-Ronen, O. et al. (2014). "Multimodal biometrics for mobile authentication". Biometrics (IJCB), 2014 IEEE International Joint Conference, 1-8.

Gudavalli, M., Raju, S. V., Babu, A. V. et al. (2012). "Multimodal Biometrics—Sources, Architecture and Fusion Techniques: An Overview". Biometrics and Security Technologies (ISBAST), 2012 International Symposium, 27-34.

Kwapisz, J. R., Weiss, G. M., & Moore, S. A. (2010). "Cell phone-based biometric identification". Biometrics: Theory Applications and Systems (BTAS), 2010 Fourth IEEE International Conference, 1-7.

Cimato, S., Sassi, R., & Scotti, F. (2008). "Biometrics and Privacy". Recent Patents on Computer Science, 1(2), 98-109.

\* cited by examiner

SYSTEM, METHOD AND COMPUTER PROGRAM PRODUCT FOR CONTROLLING AND ALTERING BIOLOGICAL, BIOMETRIC, AND IDIOSYNCRATIC AUTHENTICATIONS

BACKGROUND

The present invention relates generally to an authentication control method, and more particularly, but not by way of limitation, to a system, method, and computer program product for using biological and idiosyncratic signals with user-specified weights and system-derived confidences in an authentication technique to change biological, biometric, and idiosyncrasy-based passwords.

Biometric, biological and idiosyncratic passwords have been used in authentication systems to access devices such as smart phones, laptops, tablets as well as to log into applications on devices such as a bank application. However, once a biometric, biological and/or idiosyncratic password is given, there is no way to change the data behind the password (i.e., a user cannot change their retina scan data, thumbprint, etc.), and thus a hacker getting hold of such data will result in the authentication being forever compromised.

SUMMARY

In an exemplary embodiment, the present invention can provide a computer-implemented authentication control method, the method including performing an initial calibration to login to a registered device by detecting a plurality of biological signals, biometric signals, and idiosyncratic signals of a user and selecting a combination of the plurality of biological signals, biometric signals, and idiosyncratic signals to use in an initial calibration-authentication score, computing a login-authentication score at a time of the login based on a user input of signals corresponding to the signals of the initial calibration-authentication score, and allowing the login to the registered device if the login-authentication score is within a predetermined threshold of the initial calibration-authentication score.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
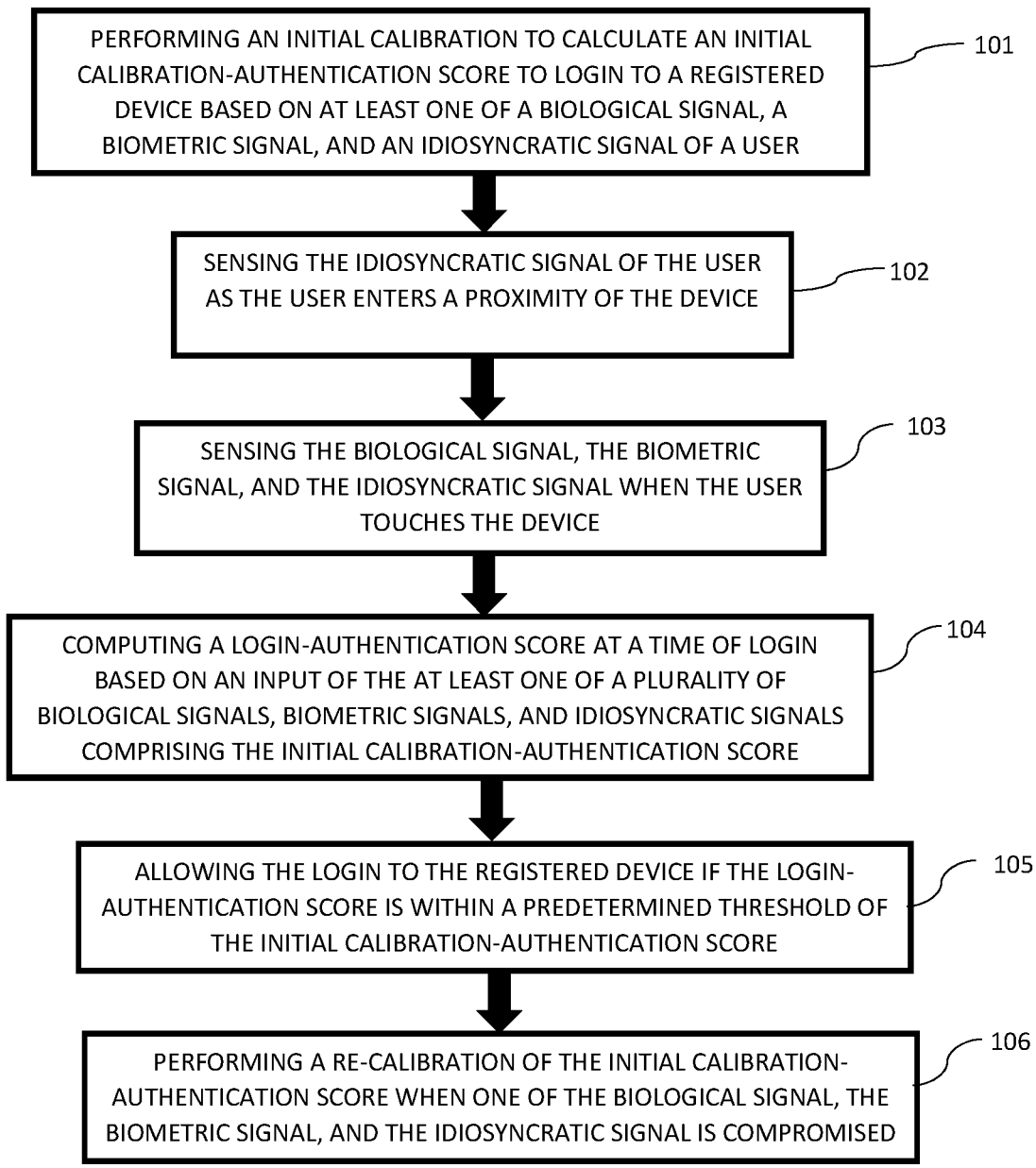
FIG. 1 exemplarily shows a high-level flow chart for an authentication control method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of an authentication control method 100 according to the present invention can include various steps for using (e.g., multiple) biological, biometric, and idiosyncratic signals by combining user-specified weights and system-derived confidences (e.g., of successfully identifying the specific signals given out by a given individual at a given goodness of quality) that allows for a user to effectively change biological/biometric and idiosyncrasy-based passwords on given devices/applications. By way of introduction of the example depicted in FIG. 3, one or more computers of a computer system 12 according to an embodiment of the present invention can include a memory 28 having instructions stored in a storage system to perform the steps of FIG. 1.

Thus, an authentication control method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 4), it is nonetheless understood that the present invention can be implemented outside of the cloud environment.

Referring now to FIG. 1, in step 101, an initial calibration is performed to calculate an initial calibration-authentication score for a login to a registered device based on at least one of a biological signal, a biometric signal, and an idiosyncratic signal of a user. An initial calibration of a given user is conducted to gauge a confidence of recognizing the several biological, biometric, and idiosyncratic signals that a user sends to the device and an initial calibration-authentication score $Auth_c(x)$ is computed for a user by factoring in the user's preferences to each signal based on policies (e.g., including the user choosing to completely ignore some signals of their choice). That is, a plurality of signals are detected and the user is allowed to select which of the plurality of signals that the user wants to use (or does not want to use) as part of the password authentication. For example, the user can request that their retina scan be completely ignored as part of the password authentication and request that their thumbprint, a sound of their coughing, and their blood pressure be used). Thus, the initial calibration is a two-step process of first detecting the plurality of signals that can be used for password authentication and then the user (or system) selecting which one or more of the plurality of signals to use as the initial calibration-authentication score $Auth_c(x)$.

The calibration process in step 101 is performed initially when the user registers himself/herself to a given device. During the calibration, the user is asked by the device (or application on a device) to input different biometric/biologic signals and carry out different actions (e.g., to input idiosyncratic signals). The signals and actions are learned and recorded, such as walking around, talking, smiling, coughing, laughing, a blood pressure, a retina scan, a fingerprint, etc. That is, step 101 collects biometric, biological and idiosyncratic signals for the specific user. Subsequently, a policy map is created, including a confidence score of each signal that was detected during the calibration, and is given to the user for editing the user's preferred weightage to each signal (or, an automated weightage is assigned to chosen signals and the user is notified). The user is requested to set different weights to each of the different signals that the user prefers to create a password. In step 101, the calibration computes a function $Auth_c(x)$ for the user on the device (or application) by, for example, $Auth_c(x)$=Sum over all calibration signals (e.g., the confidence score to a given calibration signal x User's preferred weightage to that calibration signal).

For example, the password can include the retina scan, how the user smiles, and a thumbprint each weighted by the user (e.g., 40% of the password is a retina scan, 50% is a smile, and 10% is a thumbprint). A calibration verifies any allowable range of values permitted by the device/application provider. The allowable range of values can be prescribed as a combination of (a) business policies, which practically could be driven by for example certain attributes that the vendor might prefer or be against or know something in a domain-specific (such as location-specific, etc) manner, and (b) device capabilities in which if a device manufacturer knows that the "microphone" of the device is not too good then it might inherently impose a limit on how much advisable it is to rely upon "faint noises/sounds heard" (or prescribe imposing a limit, in which case it will also go back to point a made above—the business policies—whether the vendor follows the prescription of the device manufacturer or not). Thus, this can ensure that inherent device constraints/limitations can be injected into the calibration and the overall access control also takes that into account in order to avoid inadvertent/accidental access and safeguard against potentially the more fragile (or more exposed/vulnerable) sensors that can be more easily-spoofed. In other embodiments, the initial calibration can automatically assign weights to one or a plurality of signals for the password.

In step 102, the idiosyncratic signal(s) of the user are sensed as the user enters a proximity of the device. That is, when an individual approaches the device, a set of idiosyncratic signals are sensed (e.g., detected) either directly from the device or from other nearby devices that the device recognizes (e.g., sound of cough, pattern of sound of footsteps, identification of voice, etc.). In other words, idiosyncratic signals are detected when the user is within a proximity of the device.

In step 103, the biological signal, the biometric signal, and other idiosyncratic signals are sensed (e.g., detected) when the user touches the device (e.g., when the user handles the device). For example, when the user touches (e.g., or attempts to access) the device and wants to get access to the password-protected device (e.g., or to some application running in the device), a set of biological, biometric, and idiosyncratic signals are sensed such as fingerprints, photo of the face/iris, the sequence of finger-pressure applied on the device, etc.

In step 104, a login-authentication score is computed from the detected biometric signal(s), idiosyncratic signal(s), and the biological signal(s) corresponding to the signals of the initial calibration-authentication score. In other words, the login-authentication score is computed for the signals input by the user at a time of login corresponding to the initial calibration signals that make the password. That is, a policy engine (e.g., a password policy engine set by the user or system) is triggered and an authentication score is computed as a function $Auth(x)$ defined as: $Auth(x)$=Sum of all observed signals (e.g., system's confidence score to a given signal x User's preferred weightage to that signal). It is noted that $Auth(x)$ can be defined in many other different ways too, and the above is only a sample representation of one possible definition among many. For example, each of the observed signals of the password is computed with a confidence to how accurate the signal is with the baseline-calibrated signal (e.g., a thumbprint scan is a 95% match of the calibrated thumbprint scan).

In step 105, the login to the registered device is allowed if the login-authentication score is within a predetermined threshold of the initial calibration-authentication score. That is, the output of $Auth(x)$ is compared with the value of $Auth_c(x)$. If the error between the value of $Auth(x)$ and $Auth_c(x)$ is permissible (e.g., within the predetermined threshold) on a given device or a given application, then the user is allowed to access the device or the application. In other words, step 105 matches the several signals received in the observation process, with the expected signals from the given user, while assigning the policy-specified weights to each signal, and combining that to the system's confidence score to each.

For example, if the initial calibration-authentication score is weighted 20% on a retina scan (e.g., biological signal), 35% on a right thumbprint (e.g., biometric signal), and 45% on a typical way of rubbing hands (e.g., idiosyncratic signal) and the login-authentication score is 100% for the retina scan, 80% for the right thumbprint, and 80% for the typical way of rubbing hands, the $Auth(x)$ is 84% as compared to the $Auth_c(x)$ (e.g., 100% confidence in the retina scan is 20%, 80% confidence in the right thumbprint is 28%, and 80% confidence in the typical way of rubbing hands is 36%). Therefore, if the predetermined threshold is a tolerance of, for example, a 17% error, then the login is allowed. However, if the tolerance is a 10% error, the user is requested to attempt to login again because access is denied.

In some embodiments, when the login-authentication score is computed, an additional security parameter is calculated by determining a difference in a depth between two features on a user's face (e.g., a difference between a point on the user's nose and a point on the user's eye to confirm a human is interacting with the device). Potential hackers have utilized two-dimensional photographs in order to access a user's device when, for example, a retina scan is required. Thus, by having the additional security parameter determining that an actual human is attempting to login to the device, additional security can be provided.

In step 106, a re-calibration of the initial calibration-authentication score is performed when one of the biological signal(s), the biometric signals(s), and the idiosyncratic signal(s) is compromised. If a potential hacker obtains, for example, a retina scan of the user and the retina scan was part of the initial calibration-authentication score $Auth_c(x)$, the user is requested to change which parameters (or the weight given to the parameters) are used in the initial calibration-authentication score $Auth_c(x)$. That is, if a password is leaked (but the user can log in), then, the user is requested to alter (or agree to the system altering) the user-specified policy of signals and the weights given to each of the used signals. Or, if a password is changed by a hacker, then the user will have to go through a traditional "forgot your password—change it here" mechanism, but the password change process will involve filling in the policy values for the several biological and idiosyncratic parameters.

It is noted that step 106 can suggest the user a set of "significantly different" combinations of signals and weights (associated to each signal) for the user to make a choice, by comparing with the password history, or make an alteration to the password using the signals and weights (again by comparing with the password history) and simply notify the user that the password has been updated and possibly the signals (and the weights) used in the updated password. For example, a significantly different combination can include an entirely new set of signals to base the password on (e.g., if a retina scan and thumbprint were used, suggesting a sound of coughing and blood pressure be used).

In one exemplary embodiment, a user's password is weighted 20% on his retina scan, 35% on his right thumbprint, and 45% on his typical way of rubbing hands. A hacker copies and logs onto his device, and the hacking is detected. In one instance, the user is given two alternative options of changing his password such as a first option to weight 30% on his left index finger print and 70% on his coughing style and a second option to weight 10% on his rubbing hands, 40% on his walking style, and 50% on his voice modulation when he speaks out a given certain sentence. The user selects one of the two options. In a second instance, the method automatically chooses the second option of the first embodiment, and notifies the user of the choice it has automatically made.

Figure 2:
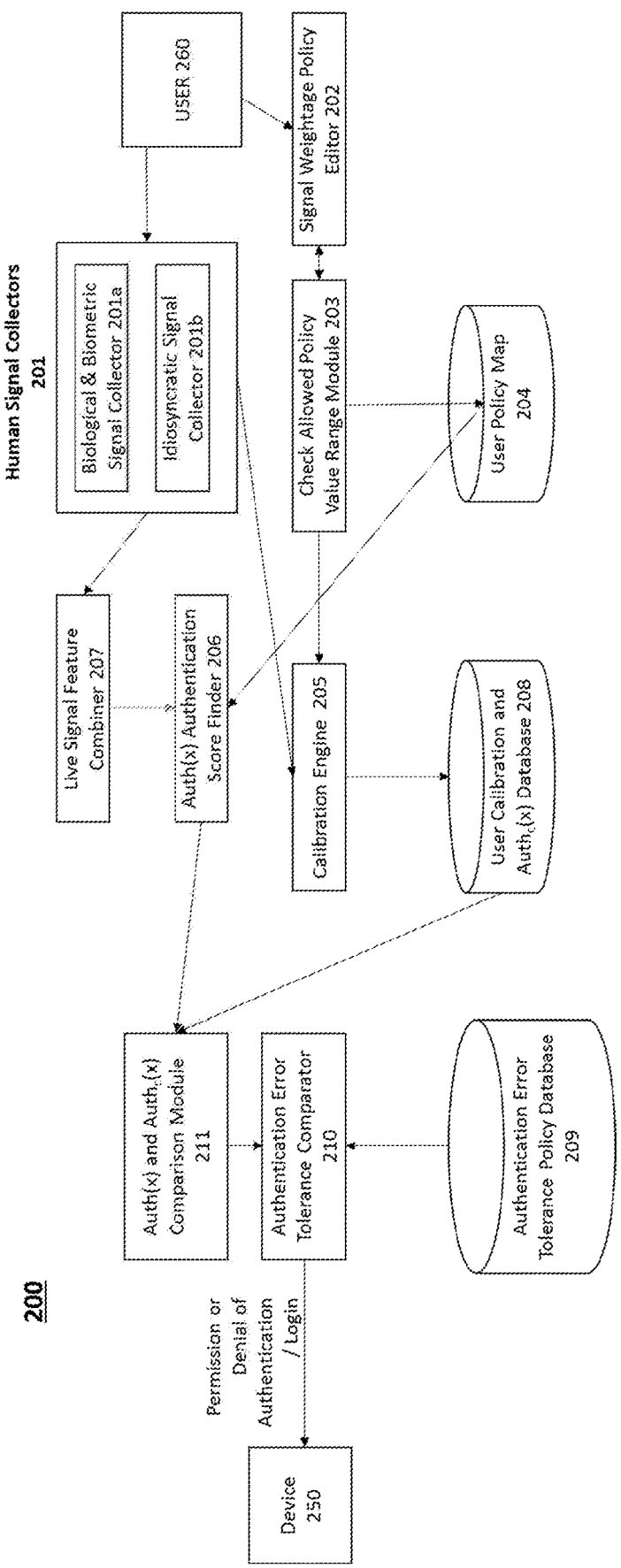
FIG. 2 exemplarily depicts an exemplary system 200 according to an embodiment of the present invention.

Referring now to FIG. 2, FIG. 2 exemplarily depicts a system 200 diagram of an embodiment of the invention. The biological and biometric signal collector 201 and an idiosyncratic signal collector 201b of the human signal collectors 201 collects biological signals, biometric signals, and idiosyncratic signals from the user 260. The calibration engine 205 triggers for the initial calibration-authentication score to be created by the calibration engine 205 and the user calibration and $Auth_c(x)$ database 208.

When the user approaches a proximity of the device, the signals of the user are collected again by the human signal collectors 201 and the live signal feature combiner 207 combines the signals for the Auth(x) authentication score finder 206 to compute the login-authentication score. The Auth(x) and $Auth_c(x)$ comparison module 211 compares the computed login-authentication score with the initial calibration-authentication score and the authentication error tolerance comparator 210 determines if the error between the two scores is within a predetermined threshold based on rules of the authentication error tolerance policy database 209. The device 250 then allows the user to access the device based on the result from the authentication error tolerance comparator 210.

If one of the biometric, biological, and idiosyncratic signal(s) is compromised, the signal weightage policy editor 202 requests the user to change the policy (or automatically changes the policy) by the check allowed policy value range module 203 checking the user policy map 204 to compute a new initial calibration-authentication score.

Thus, the method 100 and system 200 allow for using multiple biological and idiosyncratic signals by combining user-specified weights and system-derived confidences (of successfully identifying the specific signals given out by a given individual at a given goodness of quality) to allow for a user to effectively change biological/biometric and idiosyncrasy-based passwords on given devices/applications.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
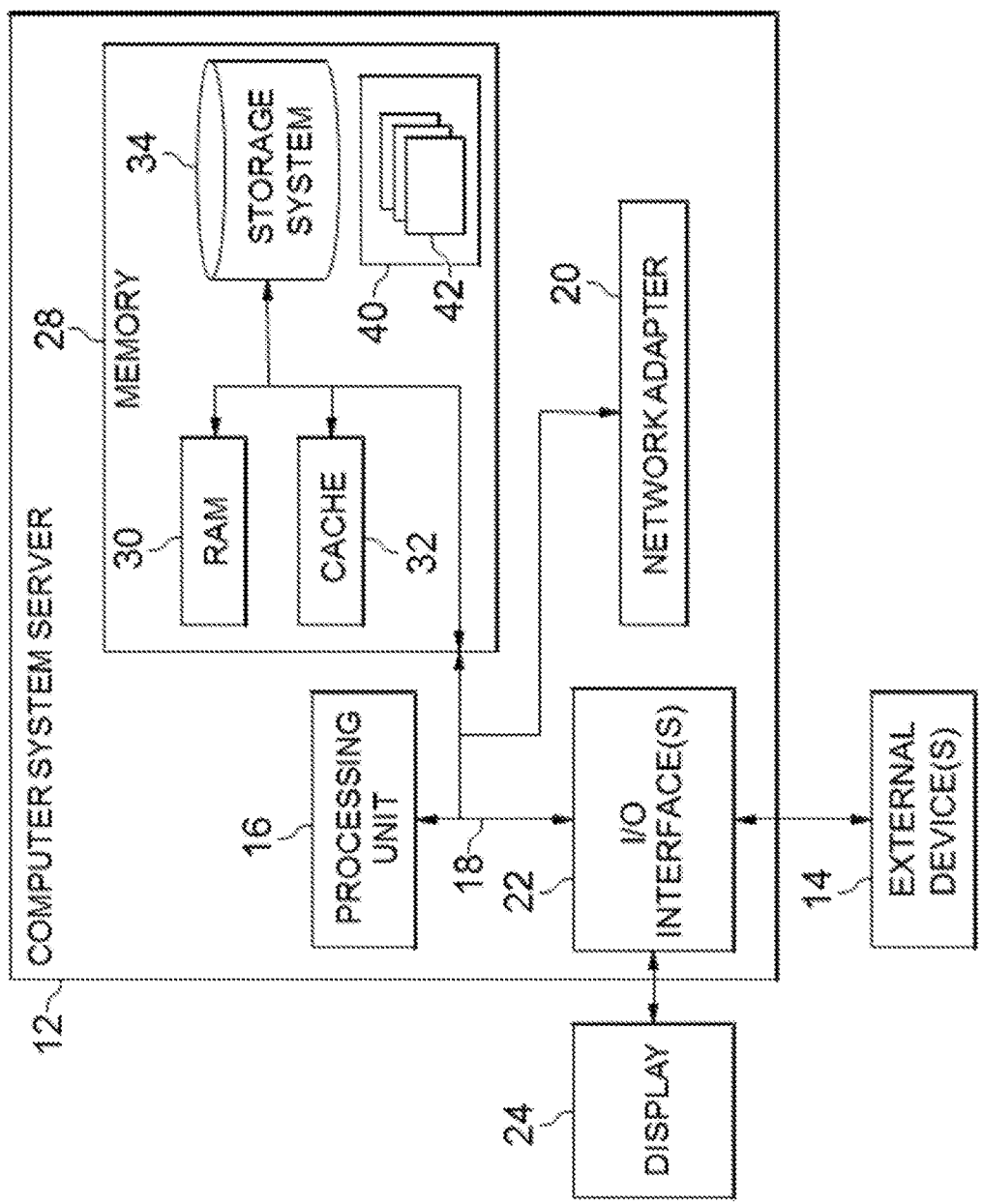
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
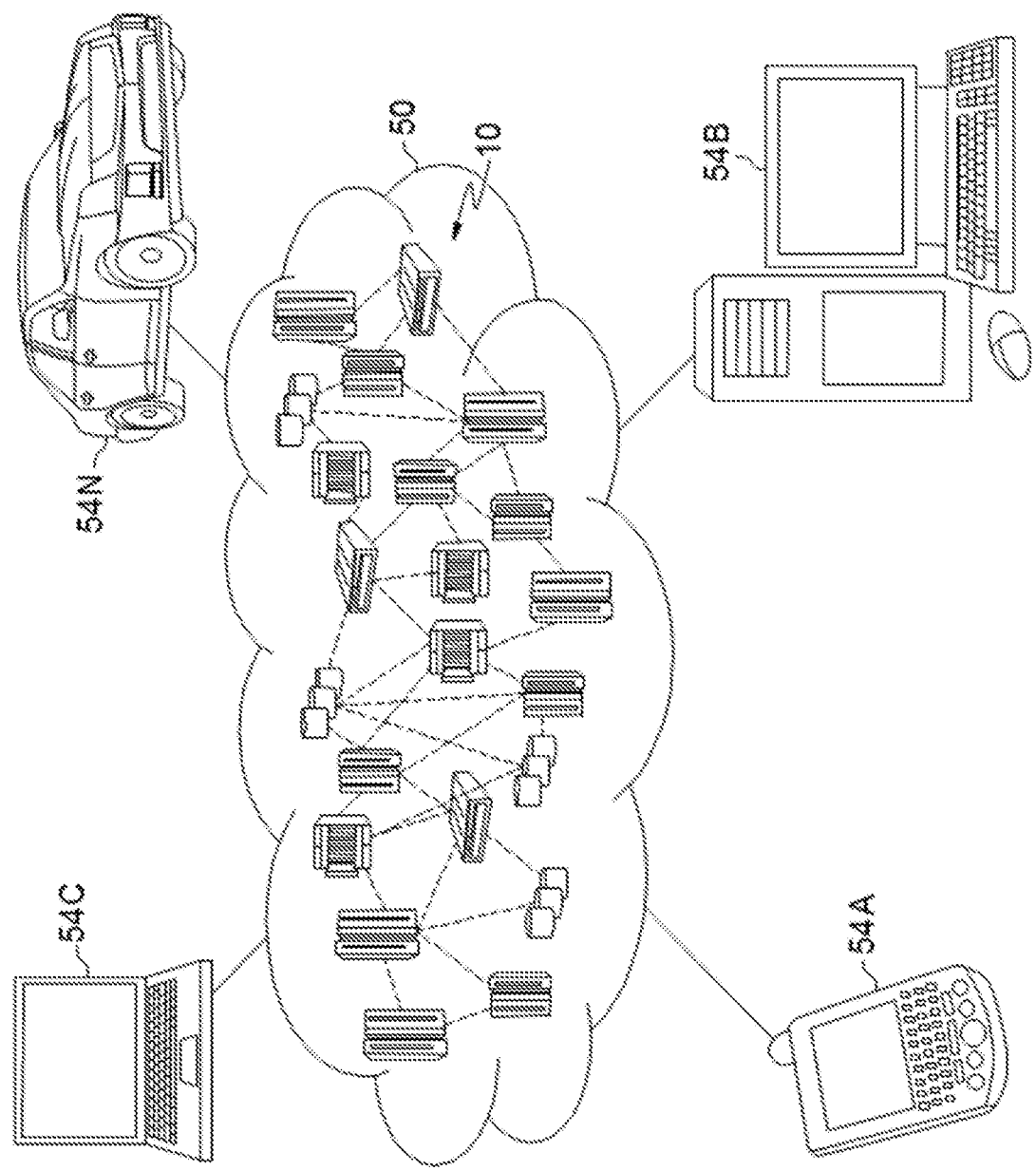
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
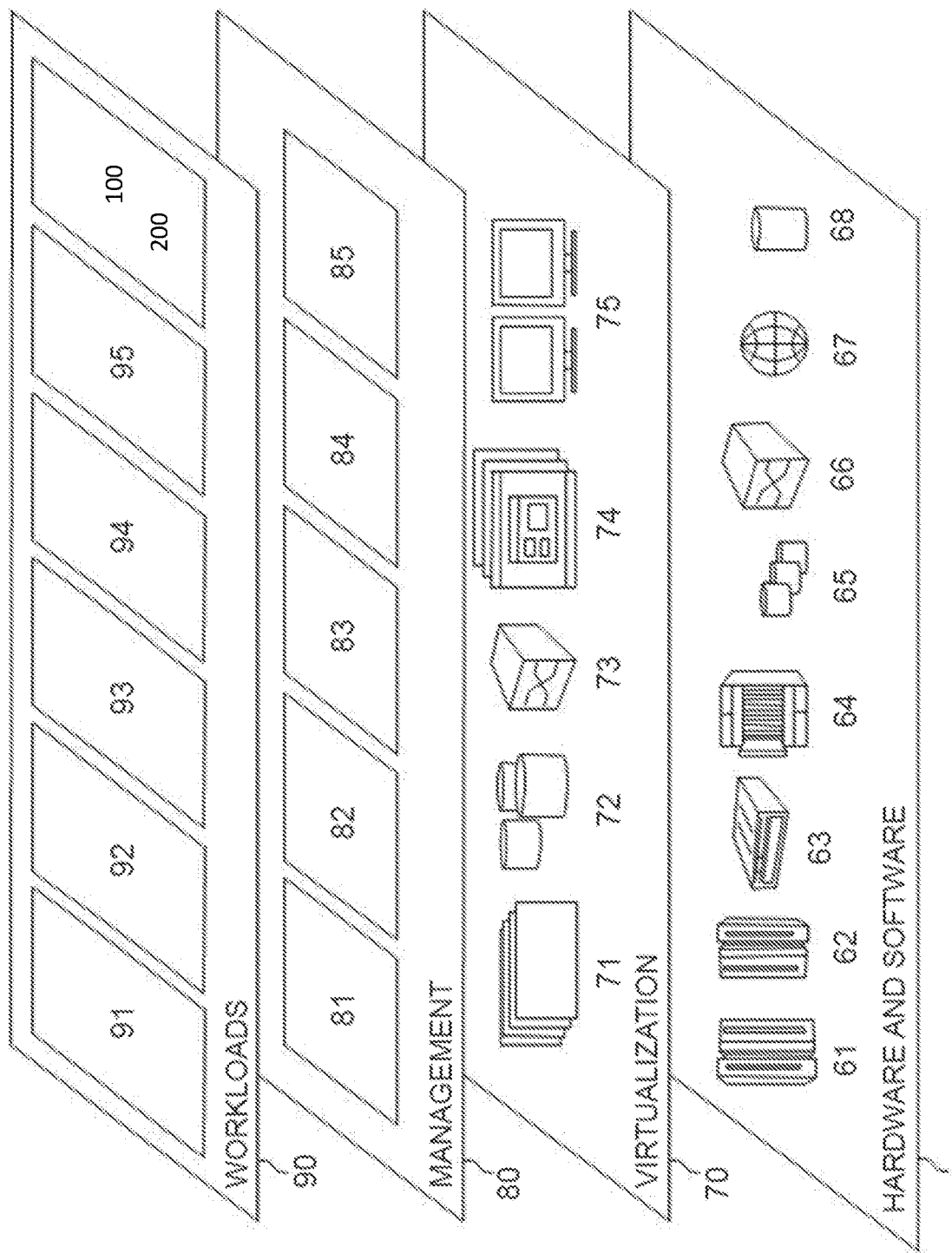
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication control method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented authentication control method, the method comprising:
    performing an initial calibration to login to a registered device by detecting:
        a plurality of biological signals of a user;
        a plurality of biometric signals of the user; and
        a plurality of idiosyncratic signals of the user;
    selecting a combination of the plurality of biological signals, biometric signals, and idiosyncratic signals to use in an initial calibration-authentication score, the combination including at least two of the biological signals, two of the biometric signals, and two of the idiosyncratic signals;
    computing a login-authentication score at a time of the login based on a dynamic user input of signals less than a total number of the signals corresponding to the signals of the initial calibration-authentication score, the login-authentication score being based on a policy engine that varies weights assigned to each of the combination of the plurality of biological signals, biometric signals, and idiosyncratic signals;
    allowing the login to the registered device if the login-authentication score is within a predetermined threshold of the initial calibration-authentication score;
    enabling the user to alter the dynamic user input selected in the selecting each time at the login to include a number of the plurality of the signals less than or equal to the total number of the signals;
    performing a re-calibration of the combination of signals used in the initial calibration-authentication score when one of the biological signals, the biometric signals, and the idiosyncratic signals is compromised by a third party; and performing a re-calibration of the weights assigned to each of the signals in the combination of signals used in the initial calibration-authentication score when one of the biological signals, the biometric signals, and the idiosyncratic signals is compromised by a third party, wherein the biological signals are periodically measured with respect to time.

2. The computer-implemented method of claim 1, wherein the initial calibration-authentication score includes a weighted combination of at least two of the plurality of biological signals, biometric signals, and idiosyncratic signals.

3. The computer-implemented method of claim 1, wherein the initial calibration-authentication score includes a weight assigned to each of the signals used in the combination of signals for the initial calibration-authentication score.

4. The computer-implemented method of claim 1, further comprising sensing the biological signal, the biometric signal, and the idiosyncratic signal corresponding to the combination of signals used in the initial calibration-authentication score when the user touches the registered device at the time of the login.

5. The computer-implemented method of claim 1, wherein the login-authentication score comprises a confidence score for each of the signals corresponding to the signals of the initial calibration-authentication score matching the initially detected signal in the initial calibration.

6. The computer-implemented method of claim 1, wherein the performing the re-calibration of the combination of signals used in the initial calibration-authentication score requests the user to alter the signals used in the combination of signals for the initial calibration-authentication score when one of the signals is compromised.

7. The computer-implemented method of claim 1, wherein the performing the re-calibration of the combination of signals used in the initial calibration-authentication score requests the user to alter the weights used for each of the signals in the combination of signals for the initial calibration-authentication score when one of the signals is compromised.

8. The computer-implemented method of claim 1, embodied in a cloud-computing environment.

9. A computer program product for authentication control, the computer program product comprising a computer readable storage medium having program instructions embodied therewith, the program instructions executable by a computer to cause the computer to perform:

performing an initial calibration to login to a registered device by detecting:
a plurality of biological signals of a user;
a plurality of biometric signals of the user; and
a plurality of idiosyncratic signals of the user;

selecting a combination of the plurality of biological signals, biometric signals, and idiosyncratic signals to use in an initial calibration-authentication score, the combination including at least two of the biological signals, two of the biometric signals, and two of the idiosyncratic signals;

computing a login-authentication score at a time of the login based on a dynamic user input of signals less than a total number of the signals corresponding to the signals of the initial calibration-authentication score, the login-authentication score being based on a policy engine that varies weights assigned to each of the combination of the plurality of biological signals, biometric signals, and idiosyncratic signals;

allowing the login to the registered device if the login-authentication score is within a predetermined threshold of the initial calibration-authentication score;

enabling the user to alter the dynamic user input selected in the selecting each time at the login to include a number of the plurality of the signals less than or equal to the total number of the signals;

performing a re-calibration of the combination of signals used in the initial calibration-authentication score when one of the biological signals, the biometric signals, and the idiosyncratic signals is compromised by a third party; and performing a re-calibration of the weights assigned to each of the signals in the combination of signals used in the initial calibration-authentication score when one of the biological signals, the biometric signals, and the idiosyncratic signals is compromised by a third party, wherein the biological signals are periodically measured with respect to time.

10. The computer program product of claim 9, wherein the initial calibration-authentication score includes a weighted combination of at least two of the plurality of biological signals, biometric signals, and idiosyncratic signals.

11. The computer program product of claim 9, wherein the initial calibration-authentication score includes a weight assigned to each of the signals used in the combination of signals for the initial calibration-authentication score.

12. An authentication control system, said system comprising:
a processor; and
a memory, the memory storing instructions to cause the processor to perform:
performing an initial calibration to login to a registered device by detecting:
a plurality of biological signals of a user;
a plurality of biometric signals of the user; and
a plurality of idiosyncratic signals of the user;

selecting a combination of the plurality of biological signals, biometric signals, and idiosyncratic signals to use in an initial calibration-authentication score, the combination including at least two of the biological signals, two of the biometric signals, and two of the idiosyncratic signals;

computing a login-authentication score at a time of the login based on a dynamic user input of signals less than a total number of the signals corresponding to the signals of the initial calibration-authentication score, the login-authentication score being based on a policy engine that varies weights assigned to each of the combination of the plurality of biological signals, biometric signals, and idiosyncratic signals;

allowing the login to the registered device if the login-authentication score is within a predetermined threshold of the initial calibration-authentication score;

enabling the user to alter the dynamic user input selected in the selecting each time at the login to include a number of the plurality of the signals less than or equal to the total number of the signals;

performing a re-calibration of the combination of signals used in the initial calibration-authentication score when one of the biological signals, the biometric signals, and the idiosyncratic signals is compromised by a third party; and performing a re-calibration of the weights assigned to each of the signals in the combination of signals used in the initial calibration-authentication score when one of the biological signals, the biometric signals, and the idiosyncratic signals is compromised by a third party, wherein the biological signals are periodically measured with respect to time.

13. The system of claim 12, embodied in a cloud-computing environment.

* * * * *